UNITED STATES PATENT OFFICE.

REINHOLD GRÜTER AND HEINRICH POHL, OF CHARLOTTENBURG, GERMANY, ASSIGNORS TO CHEMISCHE WERKE VORM. DR. HEINRICH BYK, OF CHARLOTTENBURG, GERMANY, A CORPORATION OF GERMANY.

STABLE MIXTURE FOR PRODUCING HYDROGEN PEROXID.

975,354.     Specification of Letters Patent.     Patented Nov. 8, 1910.

No Drawing. Original application filed May 4, 1909, Serial No. 493,918. Divided and this application filed July 14, 1910. Serial No. 572,005.

*To all whom it may concern:*

Be it known that we, REINHOLD GRÜTER and HEINRICH POHL, citizens of the German Empire, residing at Charlottenburg, in said Empire of Germany, have invented certain new and useful Improvements in Stable Mixtures of Perborates for Producing Hydrogen Peroxid, of which the following is a specification.

In a prior application for Letters Patent, Serial No. 493,918, filed May 4, 1909, we have described that completely or partially dehydrated perborates form together with solid acid substances stable mixtures which yield hydrogen peroxid on coming into contact with water. We have further found that such substances, when mixed with suitable salts, give valuable products which are adapted for various purposes. For instance, mixtures of completely or partially dehydrated perborates, acid substances and soaps (viz., fatty acid salts), represent products which on coming into contact with water develop hydrogen peroxid besides soap, and which are excellently adapted for bleaching and laundry purposes. Compared with other products these mixtures have the advantage of liberating the active oxygen completely in the form of hydrogen peroxid. Such soaps with latent hydrogen peroxid may also be applied to advantage as cosmetic and dental soaps owing to their neutral reaction. A suitable product is obtained, for instance, when 100 parts by weight of sodium perborate containing 1 molecule of water of crystallization are well mixed with 172 parts by weight of dry bitartrate of sodium and 100 parts by weight of dry soap powder.

Carbonates also yield together with completely or partially dehydrated perborates and acid substances valuable products. For instance, calcium carbonate mixed together with completely or partially dehydrated perborates and acid substances yields a product which combines the bleaching, disinfecting and deodorizing effect of the hydrogen peroxid with the mechanically purifying properties of the calcium carbonate. Such a product is therefore of extreme value for dental purposes as a dentifrice. For this purpose 100 parts by weight of sodium perborate containing 1 molecule of water of crystallization, 172 parts by weight of dry bitartrate of sodium and 500 parts by weight of precipitated calcium carbonate are well mixed together.

When to the mixtures of completely or partially dehydrated perborates with acid substances are added salts, which decompose hydrogen peroxid, such as for instance, salts of manganese, cobalt, copper or iodin, a solution of hydrogen peroxid is first obtained on dissolving such mixtures. The hydrogen peroxid is then split into oxygen by the decomposing salt. By the addition of a small quantity of salt the development of oxygen takes place slowly and gradually, by adding more salt more rapidly. The addition of decomposing substances is in each case small, that is to say, 92 parts by weight of sodium perborate containing $\frac{1}{2}$ molecule of water of crystallization, are mixed with 188 parts by weight of potassium bitartrate and 10 parts by weight of dehydrated manganese sulfate. Such mixtures are adapted for developing hydrogen peroxid and oxygen useful in bleaching and deodorizing. Also salts with disinfecting or astringent properties yield together with partially or completely dehydrated perborates and acid substances valuable mixtures. For instance, salicylic salts, tannic salts, salts of aluminum, bismuth, zinc, mercury, silver mixed with partially or completely dehydrated perborates and acid substances give valuable products which combine the disinfecting properties of hydrogen peroxid with the astringent properties of the salts named and which therfore render useful services in powder form and in solution for treating wounds. For example, 100 parts by weight of finely ground sodium perborate, containing 1 molecule of water of crystallization, are mixed with 172 parts by weight of ground dehydrated sodium bitartrate and 100 parts by weight of dried aluminum tartrate. To all the before-mentioned mixtures perfumes or flavoring substances may be added.

What we claim is:

1. The herein described new solid stable mixtures of perborates containing a smaller quantity of water of crystallization than completely hydrated perborates, solid acid substances and salts having disinfecting or astringent properties, said mixtures yielding hydrogen peroxid with water.

2. The new solid stable mixtures of finely ground perborates containing a smaller quantity of water of crystallization than completely hydrated perborates, finely ground solid acid substances and dried salts having disinfecting or astringent properties, said mixtures yielding with water hydrogen peroxid.

In testimony, that we claim the foregoing as our invention, we have signed our names in presence of two subscribing witnesses.

REINHOLD GRÜTER.
HEINRICH POHL.

Witnesses:
 HENRY HASPER,
 WOLDEMAR HAUPT.